Patented Apr. 24, 1951

2,550,476

UNITED STATES PATENT OFFICE 2,550,476

MINERAL AGGREGATE BONDING COMPOSITION

Arthur B. Hersberger, Drexel Hill, Pa., assignor to The Atlantic Refining Company, Philadelphia, Pa., a corporation of Pennsylvania No Drawing. Application November 18, 1947, Serial No. 786,815

7 Claims. (Cl. 106—273)

This invention relates to improved mineral aggregate bonding compositions and more particularly to the preparation of improved road paving compositions.

The two methods generally used in the preparation of bituminous pavements are, one in which a layer of bituminous cut-back or emulsion is spread on a road, a layer of mineral aggregate such as crushed stone is spread upon it, and the mixture is compacted; and the other method is one in which mineral aggregate is first provided with a coating of bitumen by mixing the aggregate mechanically with a bitumen or bituminous cut-back or emulsion until an adhesive coating of the bitumen is formed on each piece of the aggregate, the coated aggregate then being laid on the road and compacted. Where aggregate is used that has first been dried and hot bitumen or bituminous cut-back applied to the aggregate, there is little difficulty experienced in securing a good bond between the bitumen and the aggregate, except with an acidic aggregate such as siliceous aggregates.

One of the objects of the present invention is to permit the coating of surfaces of damp or wet aggregates with a bituminous composition in such a manner that the coating obtained is satisfactory and produces a firmly bonded mass.

A further object of this invention is to prepare a paving mixture bonded with asphalt in which the asphalt coating, when applied to either dry or wet aggregate is not readily displaced or stripped when subjected to the action of water.

A still further object of this invention is to prepare a bitumen or bituminous mixture containing an anti-stripping or adhesive agent which is stable to heat over considerable periods, and which is particularly adapted for incorporation in bitumens, asphalts, and road oils which may be stored, transported, or applied at elevated temperatures.

The present invention relates to a method of improving the adhesivity of bitumen to not only alkaline stones, such as limestone, slag, and dolomite, but also to acidic or siliceous type of mineral aggregates. Not only dry, but also wet aggregates may be successfully coated by the products of the present invention, and the pavings thereby prepared will not disintegrate under the action of water. It will be understood that the invention is especially advantageous in its application to the coating of wet mineral aggregates with bitumen, bituminous cut-backs, and bituminous emulsions.

Since adhesiveness is a consequence of wetting power, it is important that the wetting power of the bituminous binders toward the mineral aggregate be as high as possible. In the presence of moisture or water, adhesiveness depends upon the respective wetting powers of water and the bituminous binder toward the mineral aggregate; if the wetting power of the water is higher than that of the binder, the former will displace the latter, and prevent the bituminous binder from adhering to the surface of the aggregate. It is, therefore, an object of this invention to improve the adhesivity of the bituminous material as hereinafter described.

In accordance with the present invention, it has been found that the wetting power of bitumens for all types of mineral aggregates is markedly improved by incorporating in the bitumen a relatively small quantity of a condensation product of a diamine with a distillation residue from the production of alkenyl substituted dicarboxylic acid anhydrides, the composition of such residue not being definitely known. However, it is believed that the residue may comprise dilactones or polymers produced during the alkylation of the dicarboxylic acid anhydride or during the separation of the alkenyl dicarboxylic acid anhydride by distillation.

These condensation products, when added to bitumens in amounts of from 0.1% to 2.0% by weight, were found to be highly satisfactory in increasing the wetting power or adhesivity of the bitumens for aggregates. While larger quantities, for example, 5% to 10% of these products may be used, the improvement in adhesivity is not increased proportionately, and it appears to be uneconomical in most cases to use more than about 2% by weight of the products. Generally, from 0.5% to 2% will suffice, except under conditions in which the aggregate is exceptionally wet.

The condensation products of this invention are soluble in or compatible with bituminous materials such as petroleum asphalts or residuums, flux asphalts, coal tar pitches or residuums, cracking still tars or residues, as well as heavy naphthenic or aromatic oils, and the like. In accordance with the present invention, the products may be incorporated in various bituminous materials including asphalt, asphalt cut-back, asphalt emulsions, etc., in order to render the bitumen more adhesive or less liable to strip from mineral aggregates.

The condensation products utilized in accordance with the present invention may be prepared by various methods, of which the following are exemplary.

Olefin hydrocarbons containing from 5 to 20 carbon atoms produced by the dehydration of the corresponding alcohols, or by the removal of hydrogen halide from the corresponding hydrocarbon halides, or by the polymerization of lower olefins such as propylene, butylene, isobutylene, the amylenes, and the hexylenes or mixtures thereof, are caused to react with an unsaturated dicarboxylic acid anhydride under the influence of heat to produce the alkenyl dicarboxylic acid anhydride and the dilactones or polymers. Suitable charge materials include maleic anhydride, citraconic anhydride, itaconic anhydride, glutaconic anhydride, methyl itaconic anhydride, and the like. The alkylation of the unsaturated dicarboxylic acid anhydride with the olefin is accomplished by heating the mixture at 350° F. to 550° F., and preferably at 400° F. for 1 to 4 hours. The reaction time and temperature will depend to a considerable degree upon the composition of the reactants. The mole ratio of the reactants may be varied, but with an equi-molar ratio, there may be obtained from 40% to 60% of alkenyl dicarboxylic acid anhydride and from 10% to 20% of the dilactone or polymer. The alkylation reaction mixture is fractionally distilled under reduced pressure to separate unreacted materials, alkenyl dicarboxylic acid anhydride, and the distillation residue or bottoms comprising the dilactone or polymer to be used in accordance with this invention. The distillation residues are generally those materials boiling above about 400° F. at 5 mm. pressure, and are brown, transparent, very viscous, tacky substances having approximately the same saponification value as the alkenyl dicarboxylic acid anhydrides from which they are derived, and are soluble in aromatic hydrocarbons, halogenated hydrocarbons, ethers, ketones, and esters.

The distillation residue from alkenyl dicarboxylic acid anhydride is reacted with a diamine or polyamine to obtain a condensation product suitable as an additive for bitumens. The diamines or polyamines may be employed in molar ratios ranging from 1 to 2, although higher ratios are not detrimental. Molar ratios of 1.3 to 2 have given very good results in the production of the condensation products. The amines which may be utilized in the condensation reaction are those containing from 2 to 18 carbon atoms, and may be exemplified by ethylene diamine, diethylene triamine, triethylene tetramine, 1-methyl ethylene diamine, 1-ethyl ethylene diamine, propylene diamine, butylene diamine, trimethyl trimethylene diamine, tetramethylene diamine, diaminopentane, or pentamethylene diamine, diaminohexane, hexamethylene diamine, heptamethylene, diamine, diamino-octane, decamethylene diamine, and the higher homologues up to 18 carbon atoms, phenylene diamine, the alkylated phenylene diamines having nuclear substituents such as methyl, ethyl, propyl, butyl, etc., naphthalene diamine, and the alkylated naphthalene diamines. The condensation reaction may be carried out by simply adding the diamine or polyamine to the alkenyl dicarboxylic acid anhydride residue preferably in solution in a solvent at ordinary temperature (60° F. to 80° F.), and then stirring vigorously. As the condensation proceeds, the temperature of the reaction mixture rises to 150° F.–220° F., with the elimination of water produced by the condensation. The condensation products, when cooled to room temperature, range from viscous, yellowish liquids to brown solids, after removal of the solvent. Solvents for the distillation residue include benzene, toluene, xylene; methyl ethyl ketone and higher ketones; propyl, butyl, amyl, and hexyl esters of the fatty acids such as acetic, propionic, butyric and valeric acids; ethyl, propyl, and butyl ethers, etc. The diamines used in the condensation reaction may or may not be diluted with solvents, depending upon their composition and physical properties. The diamine, if water soluble, may be used in a water solution, if desired. Diamines which may be solid at ordinary temperature may be dissolved in a suitable solvent before addition to the alkenyl dicarboxylic acid anhydride distillation residue. Solvents for the diamines include liquid ketones, esters, and ethers. Alternatively, solid or semi-solid diamines may be liquefied by melting and added to the anhydride distillation residue.

The present invention may be further illustrated by the following examples, which, however, are not to be construed as limiting the scope thereof.

1 mole of dodecylene obtained by the polymerization of propylene at elevated temperature in the presence of a phosphoric acid catalyst was mixed with one mole of maleic anhydride and the mixture was heated at 450° F. for 2 hours in a closed vessel under a pressure of 40 to 50 lbs. per square inch. As a result of this treatment, the dodecylene reacted with the maleic anhydride to form dodecenyl succinic anhydride and a substantial quantity of dilactone or polymer. The reaction mixture was cooled, removed from the reaction vessel, and fractionally distilled at atmospheric pressure to remove unreacted dodecylene. The pressure was then reduced to 5 to 10 mm. and dodecenyl succinic anhydride was distilled off at 320° F. to 325° F. The distillation was continued and an additional amount of the anhydride together with a small amount of dilactone was taken over until a temperature of 385° F. was reached. At this temperature there was some evidence that decomposition was commencing, i. e., a rise in pressure and a decrease in temperature. The distillation was then stopped and the distillation residue comprising what was believed to be the dilactone or polymer was removed from the still. This distillation residue was a brown, transparent, viscous, tacky mass having a saponification value of 443 as compared with 440 for the dodecenyl succinic anhydride. Such residue was soluble in aromatic hydrocarbons, halogenated hydrocarbons, ketones, esters, and ethers.

20 grams of the distillation residue was dissolved in 20 grams of toluene, and this solution was added to 13.1 grams of 68% ethylene diamine in water solution. The mixture was thoroughly stirred, and considerable heat was liberated due to the reaction. A viscous, brown mass separated from the toluene and water, and the mass amounted to 43 grams, of which 30 grams was the condensation product and the remaining 13 grams was toluene and water. The latter may be driven off by heating under reduced pressure.

Various percentages of the condensation product were incorporated in an asphalt cutback consisting of 75% of 85/100 penetration petroleum asphalt and 25% of naphtha of 55° gravity distilling between 185° F. and 350° F. 12 gram portions of the cutback containing the condensation product were added to 200 gram portions of dry 2–4 mesh stone and mixed for 3 minutes, then spread in a layer ¾ inch deep to cure for 48 hours at 110° F. The stone aggregate was 100% covered with the cutback. The following tests were then made.

The strip test was carried out by placing 25 grams of the coated stone in a 125 cc. Erlenmeyer flask, adding 75 cc. of water, rotating the flask and contents at 140° F. for 15 minutes, and then noting the percentage of the stone surfaces still coated.

The boiling test was conducted by placing 25 grams of the coated stone in a 250 cc. beaker, adding 50 cc. of water, boiling contents for 5 minutes, and noting the percentage of the stone surfaces still coated.

The wet aggregate coating test was performed by placing 25 grams of dry 2–4 mesh stone in a beaker, adding 50 cc. of water thus thoroughly wetting the stone, then adding 1.5 grams of cutback asphalt containing the condensation product, stirring the mixture for 5 minutes at 75° F., then removing the stones and noting the percentage of surface coated.

The above tests were made using rhyolite, Pennsylvania sand stone, and Virginia dolomite, and the results are given in the following table.

| Weight Per Cent Additive in Cutback | Stripping Test, Per Cent Surface Coated | | |
|---|---|---|---|
| | Rhyolite | Penna. Sandstone | Va. dolomite |
| 0.0 | 20 | 12 | 87 |
| 0.25 | 87 | 100 | 97 |
| 0.50 | 93 | 100 | 100 |
| 1.00 | 97 | 100 | 100 |
| 2.00 | 100 | 100 | 100 |

| Weight Per Cent Additive in Cutback | Boiling Test, Per Cent Surface Coated | | |
|---|---|---|---|
| | Rhyolite | Penna. Sandstone | Va. dolomite |
| 0.0 | 20 | 0 | 90 |
| 0.25 | 83 | 7 | 100 |
| 0.50 | 83 | 97 | 100 |
| 1.00 | 97 | 97 | 100 |
| 2.00 | 100 | 100 | 100 |

| | Wet Aggregate Coating, Per Cent Surface Coated | | |
|---|---|---|---|
| | Rhyolite | Penna. Sandstone | Va. dolomite |
| 0.0 | 0 | 75 | 80 |
| 0.25 | 55 | 87 | 93 |
| 0.50 | 60 | 95 | 93 |
| 1.00 | 78 | 100 | 97 |
| 2.00 | 83 | 100 | 97 |

From the above data it is evident that the incorporation of the additive in small amounts markedly improves the adhesivity of the asphalt for mineral aggregates.

I claim:

1. A mineral aggregate bonding composition comprising a bitumen and a small amount of a condensation product sufficient to substantially increase the adhesivity of the bitumen for mineral aggregates, said condensation product being prepared by reacting an olefin containing from 5 to 20 carbon atoms with an unsaturated dicarboxylic acid anhydride at 350° F. to 550° F. to produce an alkenyl dicarboxylic acid anhydride and higher boiling fractions, fractionally distilling the reaction mixture to separate the alkenyl dicarboxylic acid anhydride from the higher boiling fractions, and reacting the higher boiling fractions with from 1 to 2 molar equivalents of a diamine containing from 2 to 18 carbon atoms.

2. A mineral aggregate bonding composition comprising an asphalt and a small amount of a condensation product sufficient to substantially increase the adhesivity of the asphalt for mineral aggregates, said condensation product being prepared by reacting an olefin containing from 5 to 20 carbon atoms with an unsaturated dicarboxylic acid anhydride at 350° F. to 550° F. to produce an alkenyl dicarboxylic acid anhydride and higher boiling fractions, fractionally distilling the reaction mixture to separate the alkenyl dicarboxylic acid anhydride from the higher boiling fractions, and reacting the higher boiling fractions with from 1 to 2 molar equivalents of a diamine containing from 2 to 18 carbon atoms.

3. A mineral aggregate bonding composition comprising a cut-back asphalt and a small amount of a condensation product sufficient to substantially increase the adhesivity of the cut-back asphalt for mineral aggregates, said condensation product being prepared by reacting an olefin containing from 5 to 20 carbon atoms with an unsaturated dicarboxylic acid anhydride at 350° F. to 550° F. to produce an alkenyl dicarboxylic acid anhydride and higher boiling fractions, fractionally distilling the reaction mixture to separate the alkenyl dicarboxylic acid anhydride from the higher boiling fractions, and reacting the higher boiling fractions with from 1 to 2 molar equivalents of a diamine containing from 2 to 18 carbon atoms.

4. A mineral aggregate bonding composition comprising a bitumen and from 0.1% to 2% of a condensation product, said condensation product being prepared by reacting an olefin containing from 5 to 20 carbon atoms with an unsaturated dicarboxylic acid anhydride at 350° F. to 550° F. to produce an alkenyl dicarboxylic acid anhydride and higher boiling fractions, fractionally distilling the reaction mixture to separate the alkenyl dicarboxylic acid anhydride from the higher boiling fractions, and reacting the higher boiling fractions with from 1 to 2 molar equivalents of a diamine containing from 2 to 18 carbon atoms.

5. A mineral aggregate bonding composition comprising a bitumen and from 0.5% to 2% of a condensation product prepared by reacting dodecylene with maleic anhydride at about 450° F. to produce dodecenyl succinic acid anhydride and higher boiling fractions, fractionally distilling the reaction mixture to separate the dodecenyl succinic acid anhydride from the fractions boiling above 400° F. at 5 mm. pressure, and reacting the fractions with from 1 to 2 molar equivalents of ethylene diamine.

6. An agent for increasing the adhesivity of bitumens for mineral aggregates consisting essentially of a condensation product prepared by reacting an olefin containing from 5 to 20 carbon atoms with an unsaturated dicarboxylic acid anhydride at 350° F. to 550° F. to produce an alkenyl dicarboxylic acid anhydride and higher boiling fractions, fractionally distilling the reaction mixture to separate the alkenyl dicarboxylic acid anhydride from the higher boiling fractions, and reacting the higher boiling fractions with from 1 to 2 molar equivalents of a diamine containing from 2 to 18 carbon atoms.

7. An agent for increasing the adhesivity of bitumens for mineral aggregates consisting essentially of a condensation product prepared by reacting dodecylene with maleic anhydride at about 450° F. to produce dodecenyl succinic acid anhydride and higher boiling fractions, fractionally distilling the reaction mixture to separate the dodecenyl succinic acid anhydride from the fractions boiling above 400° F. at 5 mm. pressure, and reacting the fractions with from 1 to 2 molar equivalents of ethylene diamine.

ARTHUR B. HERSBERGER.

REFERENCES CITED

The following references are of record in the file of this patent:

UNITED STATES PATENTS

| Number | Name | Date |
|---|---|---|
| 2,182,178 | Pinkernelle | Dec. 5, 1939 |
| 2,191,295 | Dohse et al. | Feb. 20, 1940 |
| 2,200,220 | Reppe et al. | May 7, 1940 |
| 2,427,488 | Anderson et al. | Sept. 16, 1947 |
| 2,482,586 | Hersberger et al. | Sept. 20, 1949 |

FOREIGN PATENTS

| Number | Country | Date |
|---|---|---|
| 568,385 | Great Britain | Apr. 3, 1945 |
| 847,829 | Great Britain | July 10, 1939 |